April 12, 1955 E. W. DONATH 2,706,250
CIRCUIT CONTROL APPARATUS
Filed March 6, 1952 2 Sheets-Sheet 1
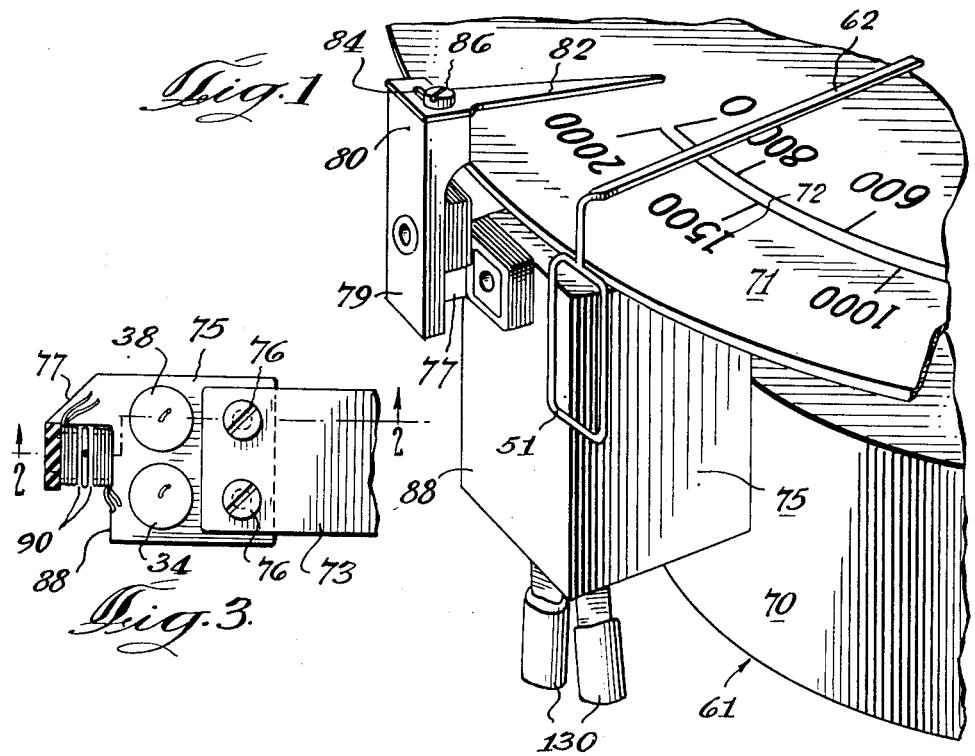
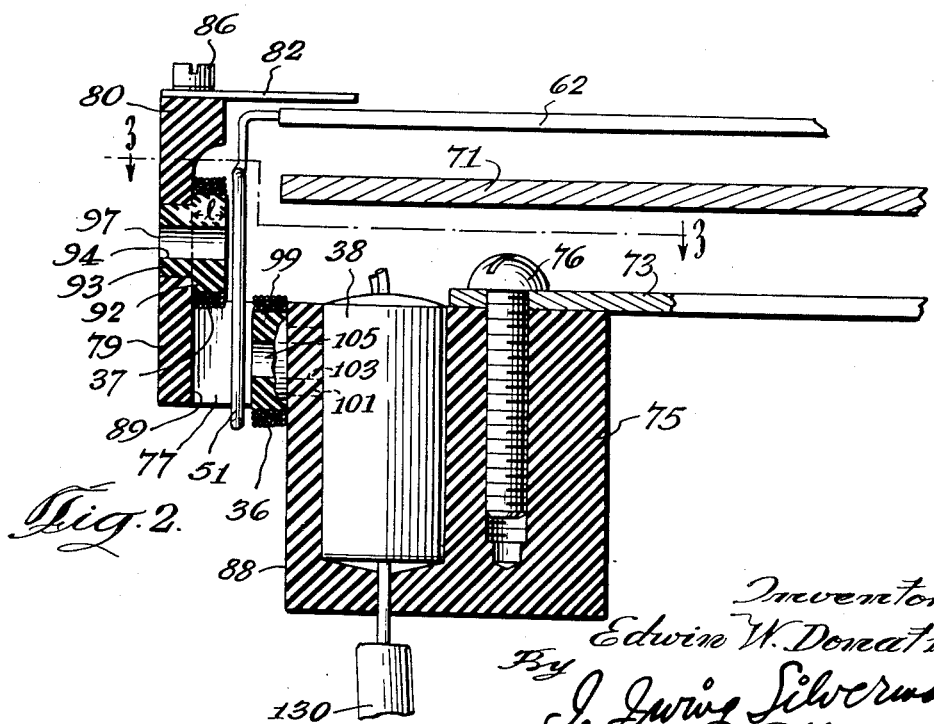
Inventor
Edwin W. Donath
By J. Irving Silverman
Attorney

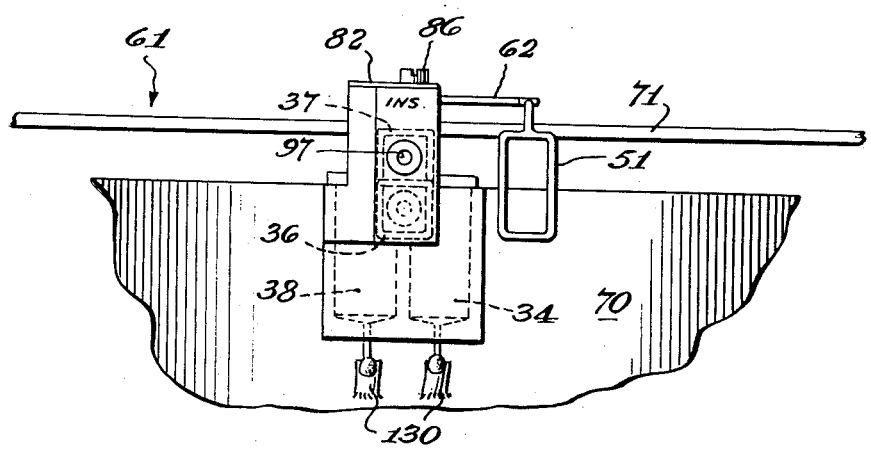
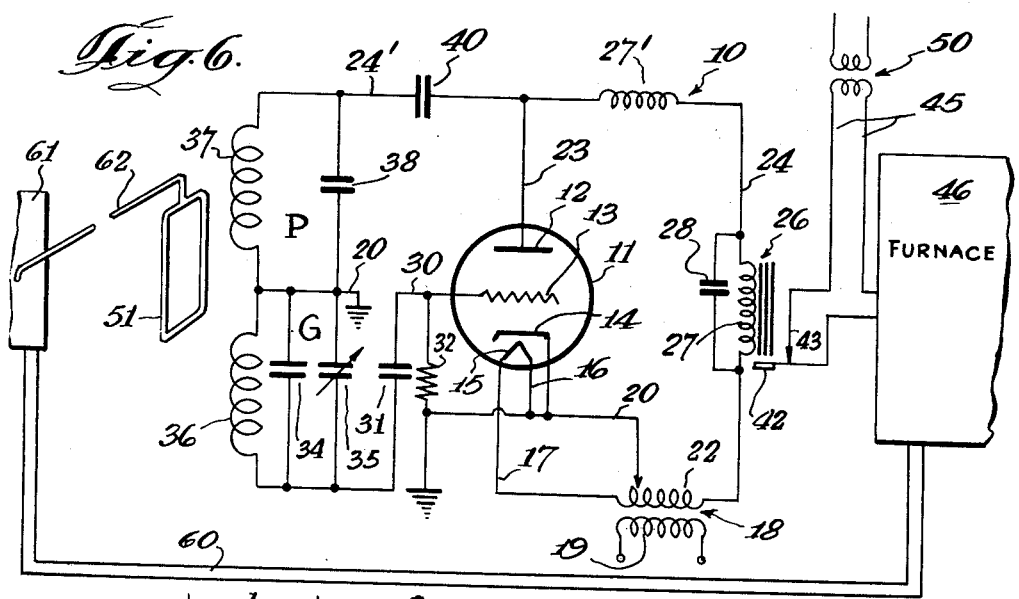
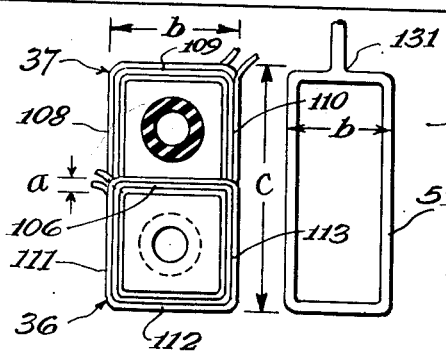

United States Patent Office 2,706,250
Patented Apr. 12, 1955

2,706,250

CIRCUIT CONTROL APPARATUS

Edwin W. Donath, Chicago, Ill., assignor to Illinois Testing Laboratories, Inc., Chicago, Ill., a corporation of Illinois Application March 6, 1952, Serial No. 275,174

12 Claims. (Cl. 250—36)

This invention relates generally to circuit control apparatus and more particularly is concerned with apparatus in which some device which operates at high energy levels is controlled by a translating device, operating at a very low energy level.

The invention is especially intended for use in connection with electrical furnaces in which large currents are required to operate the furnace. Under such circumstances, a control device which is connected to operate in a circuit carrying current of the order of that used by the furnace will be large, unwieldly, inaccurate and very expensive. In such cases, it has been known that the furnace may be controlled, i. e., kept at constant temperature for example, by using a translating device, i. e., a galvanometer connected with a thermocouple subjected to the heat of the furnace. When the galvanometer registers a predetermined value the furnace circuit may be opened or closed through the medium of relays or other devices. In this manner, the only current that need be handled by the translating device is the very minute current generated in the thermocouple circuit.

In apparatus of this type the translating device usually has a moving vane or needle, and the same moves over a scale calibrated in temperature of the furnace. A manually movable pointer or marker is associated with the translating device and same may be set by the operator at any position corresponding to a given temperature. When the moving vane or needle coincides with this position the needle and pointer cooperate in some way to energize a circuit operating a relay, for example, to turn off or turn on the furnace. By way of example, the furnace may be set to turn off when it reaches a given temperature so that it will not exceed that temperature. Another manner in which the apparatus may be used is to operate warning devices when predetermined temperatures have been reached.

Many constructions for apparatus of this kind have been devised heretofore. In some of these there is required a physical engagement between the pointer and the needle or vane. This physical engagement may operate a switch mechanically or provide electrical contact of some kind. The principal difficulty with such devices has been that the energy required for moving the needle with sufficient power to make an electrical contact or move a mechanical object is not always available in translating devices. Furthermore, even if available, the sensitivity of such devices is low; there is mechanical adjustment required which gives rise to unreliable operation and wear; and in the case of electrical contacts, there is corrosion, sparking, and pitting in the contacts. In this latter disadvantage, such devices cannot be utilized where fire hazards must be kept to a minimum.

One object of this invention is to provide apparatus in which there is no physical contact between the needle or vane of the translating device and the pointer or marker which is set to the desired position where the apparatus is to perform its function.

This invention is specifically directed to the construction of an apparatus in which an oscillator circuit is utilized to provide the power for operating the circuit opening or closing device or other control means, and the position of the needle or vane of the translating device relative to the manually movable marker serves to cause a change in the tank circuit of the oscillating circuit. In most apparatus utilizing such an arrangement, the normal condition of the circuit is that the oscillator is operating. Under such conditions, the D. C. component in the plate circuit is low. A relay, for example, in the plate circuit of the oscillator can be adjusted so that at such low D. C. currents it is inoperative. Then, when the tank circuit conditions of the oscillator are changed to stop oscillations, the D. C. current of the plate circuit suddenly rises, operates the relay, and opens the furnace circuit for example.

The other type of arrangement uses an oscillator circuit which is normally not oscillating. The D. C. plate current is therefore high, and a relay in the circuit is energized at all times of oscillation. When the tank circuit is affected by the movable pointer or marker and the needle coinciding, oscillations begin, the D. C. plate current drops and the D. C. relay is de-energized.

This invention relates to the latter type of apparatus. Such types of apparatus are extremely sensitive, and by virtue of my invention I have increased the sensitivity greatly. By sensitivity, I have particular reference to the smallest increment of movement of the needle or vane between the conditions of oscillation and non-oscillation. The smaller this distance, the greater the sensitivity, and the easier it becomes to maintain a given condition by the control of this apparatus. In other words, if a furnace is being controlled by the apparatus, with my invention it is possible to hold any given temperature constant with less variation than heretofore possible through the use of apparatus of this kind.

It follows that a further object of the invention is to provide such apparatus in which accurate control is possible.

The salutary results of the invention are principally due to the physical construction of the tank circuit components of the oscillator circuit and their association one with the other in a novel and unobvious manner. Specifically such constructional features are objectives of the invention. Objects are: to provide novel arrangement of the tank circuit coils; to provide a novel method of coupling the coils to cause oscillation of the circuit; to provide novel mounting for the coils; to provide a novel arrangement for the tank capacitances whereby to decrease the length of the electrical leads; and to provide a novel construction for the movable arm carrying the marker or pointer.

Still another object of the invention is to provide a novel arm for carrying the marker or pointer in which it is virtually impossible for the high energy level device being controlled by the apparatus to "run away" through accidental movement of the needle or vane beyond a predetermined position thereof.

Many additional objects and great advantages of the invention will be pointed out hereinafter in connection with a complete description of a preferred embodiment thereof. I have illustrated and described such embodiment of my apparatus in order to comply with the patent statutes, pointing out wherein I have made an advance in the arts and sciences. I have referred to an electric furnace herein, because the apparatus was principally intended for use therewith, but it is desired to emphasize that many other kinds of devices can easily be controlled by the invention.

In the drawings in which the same characters of reference are used throughout to indicate the same or equivalent parts:

Fig. 1 is a perspective view of a translating device having my invention associated therewith, only a portion of the translating device being shown, since same is of conventional construction.

Fig. 2 is a sectional view taken through the apparatus and the translating device generally along the line 2—2 of Fig. 3 and in the indicated direction, with portions being shown in elevation.

Fig. 3 is a top sectional view taken along the line 3—3 of Fig. 2 and looking in the direction of the arrows, the needle and its coupling loop being shown in position immediately adjacent the tank coils.

Fig. 4 is a front-on elevational view of the apparatus, taken from the left of Fig. 1 and with the coupling loop out from between the tank coils and not in position influencing the same.

Fig. 5 is an enlarged detailed view showing the relative positions of the tank coils, their mountings, and the coupling loop.

Fig. 6 is a schematic electrical diagram of the circuit of the apparatus and showing same associated with an electrical furnace for controlling the operation thereof.

In general, and referring first to Fig. 6, the invention is associated with an oscillator circuit 10, the essentials of which are well known. There is a triode tube 11 having a plate 12, grid 13, and cathode 14. The cathode has a filament 15 energized through leads 16 and 17 from a transformer 18. The primary 19 of the transformer 18 is connected to a suitable source of A. C. such as for example a conventional 110 volt line. The lead 16 connects with an electrical conductor 20 which is grounded, and which is tapped into the secondary 22 of the transformer such that the portion of the transformer secondary to the left of the tap supplies the filament voltage, the lead 17 being connected to the left hand side of the secondary 22.

The plate 12 is connected by way of lead 23 and lead 24 to the right hand side of the secondary 22 so that the voltage across the secondary 22 from the tap to the right hand end is suitable for use as the plate supply. In the lead 24 there is an R. F. choke 27' to keep the A. C. out of the relay 26 the coil 27 of which is in series with the lead 24 as the plate load. There is a condenser 28 connected across the relay 26 to smoothen operation of the relay. The A. C. input to the tube 11 is by way of the grid lead 30 through the coupling condenser 31, the grid leak resistance 32 being connected from lead 30 to ground.

There are two tank circuits which are intended to cooperate in order to provide the oscillations. As in the case of all oscillators, a signal is fed back from the plate to the grid circuits which is 180° out of phase with the grid signal. In this manner the oscillations are self-sustaining, all in accordance with well known principles. Here the grid circuit is tuned and consists of the condensers 34 and 35 connected from lead 30 to ground, and the inductor 36 in parallel with these condensers. The condenser 34 is fixed and the condenser 35 is symbolically shown as variable. This is the trimmer for adjusting the frequency of the grid tank circuit G to be equal to the frequency of the plate tank circuit P. The plate tank circuit P consists of an inductor 37 and a condenser 38 connected in parallel from the lead 24' to ground 20. The lead 24' extends to a juncture with the lead 23, which of course is connected with the plate 12. There is a D. C. blocking condenser 40 in series with the lead 24' to keep the D. C. component of the plate current out of the tank circuit.

It will be noted that this oscillator provides no D. C. B supply, since the tube 11 serves to rectify the A. C. from the transformer 18 to provide its own plate supply.

The normal condition of the oscillator is non-oscillating. Under this circumstance, the D. C. current flowing in the plate circuit and tending to energize the relay 26 is a maximum and the relay is energized. Its armature 42 is engaged with its cooperating contact 43 thereby keeping closed the circuit 45 which controls the operation of the furnace 46. For example, this may be the current supplying circuit operating at high energy levels and obtaining its power from a suitable source through a transformer 50.

Under the above referred to conditions, the oscillator is not oscillating and there is no energy being fed back from the plate to the grid circuits. The manner in which energy is so transferred is by coupling the tank circuits P and G one with the other through the medium of the inductors 36 and 37, which of course are in the form of coils. In order to achieve coupling between the grid and plate circuits, a coupling loop 51 is used. It is moved into the influence of the two inductors 36 and 37 in a manner which will be described more fully below, and the action will start the oscillations. When the oscillations begin, the plate current will drop and the relay 26 will be de-energized, thereby opening the circuit 45 and shutting off the furnace 46. Thus, the loop 51 can properly be arranged to couple the coils 36 and 37 at any given temperature of the furnace 46 so that the temperature of the furnace can be maintained constant.

I have a thermocouple circuit 60 connected to a suitable temperature-sensitive juncture in the portion of the furnace whose temperature it is desired to control and leading to a translating device, such as for example a galvanometer 61. The galvanometer needle or vane 62 will thus move with changes in temperature, and if the coils 36 and 37 are properly oriented to some pre-determined position, the furnace will be turned off when the temperature corresponding to that position is reached.

As thus far described, the features of the invention have not been emphasized. Principally, the construction of the loop 51, the tank coils 36 and 37, the tank condensers 34 and 38 and their relations one to the other as well as the manner in which same are associated with the galvanometer 61 comprise the features of the invention.

Many practical considerations render the construction of apparatus of the kind here involved difficult, and these are not capable of ready solution. The physical construction of my apparatus readily solves many of these problems. A few have heretofore been pointed out, but others are of as great importance. The apparatus must be small and fool-proof in operation. It must be flexible and rugged, so that it can withstand hard usage. It must be easy to construct cheaply, and have easily accessible and replaceable parts.

Considering the question of sensitivity, the devices which have operated on the general principles set forth have been insensitive when compared with my apparatus. To the best of my knowledge, none have been so constructed that the difference of position corresponding to the width of the needle represents the difference between "off" and "on" in a given controlled circuit. This degree of sensitivity is capable of being achieved by my apparatus.

Referring now to Figs. 1 to 5 inclusive, I have generally shown a galvanometer 61 of any suitable type, comprising translating apparatus adapted to be actuated by the thermocouple circuit 60. For example, the galvanometer may include any kind of movement. It may be for example a millivoltmeter. I have shown a permanent magnet field piece 70, a dial 71 having indicia 72 adapted to cooperate with the meter needle or vane 62. The current produced in the circuit 60 is translated into a movement of the needle 62. The position of the needle 62 relative to the indicia 72 gives a reading of such current (or it may be voltage) which position may indicate temperature, preferably.

I provide an arm 73 which is pivoted on the same axis (not shown) as the needle 62 in any well known manner, and adapted to be manually moved to any position about the periphery of the dial. The arm carries a block 75 of insulating material to which it may be attached as for example by screws 76. The block 75 has in turn an extension 77 integrally formed therewith at an upper corner thereof, which extension serves not only to support certain means described hereinafter, but also functions as a stop for the loop 51. The extension 77 terminates in an integrally formed standard 79 which is vertically elongate, extending to a position substantially above the level of the dial 71. The top end of the standard 79 is thickened as at 80 and same supports thereon a pointer or marker 82. The marker 82 may be of any desired construction, and it will be obvious that since the same overlies the dial 71, it is intended to mark a given position on the dial. Its level is above that of the needle 62 so that the needle may execute its swing without interference, and since carried upon the manually movable arm 73, the pointer can be placed at any desired position with respect to the indicia 72. In the construction I have illustrated, the pointer or marker 82 is formed of suitable metal, slotted as at 84 for adjustment, and held in place by a screw 86 suitably screw-threaded into the thickened portion 80.

The principal components of the tank circuits P and G are carried on the end of the arm 73 in a novel manner. One tank coil 36 is carried on the outer surface 88 of the block 75, along the top edge thereof, while the other tank coil 37 is carried on the inner surface 89 of the standard 79 in position opposite the coil 36 but displaced upward therefrom. The distance between the facing ends of the coils 36 and 37 is such as to provide a narrow passageway 90 (see Fig. 3) to permit the loop 51 freely to move therebetween. The tank condensers 34 and 38 are accommodated within suitably formed cavities provided in the block 75 so that the leads for connecting the elements of the tank circuits are very short. In Figs. 1 through 5 inclusive, none of these connections are shown in order to render the drawing unencumbered, but connections are clearly diagrammed in Fig. 6.

In order to fully explain the nature of the invention, attention is once more invited to Fig. 6. It is desired when the loop 51 is not in proximity to the coils 36 and 37 that there be a relationship between them not conducive to the existence of oscillation. This could be done by the use of an additional coil so wound and placed to provide a negative coupling which opposes oscillation. I have, however, physically arranged the coils so that the negative coupling is produced by the coils themselves. Next, when the loop 51 carried by the needle 62 reaches a given position, it is desired that the loop cause there to be transfer or feedback of a signal 180° out of phase through the coupling of the coils 36 and 37, so that oscillation occurs, the negative coupling being overcome or cancelled.

In order to achieve the above ends, the coils are arranged geometrically as shown. Conveniently they are wound on identical forms in the identical manner and so associated with the arm 73. Thus, the coil 37 is wound upon a rectangular end piece 92 which may be carried by or integrally formed with a cylindrical plug 93 inserted in a suitable socket 94 formed in the standard 79. The end piece 92 and plug 93 conveniently have a central passageway 97 to enable same to be mounted upon a spindle during winding. Likewise, the coil 36 is shown mounted on an end piece 99, secured to plug 101 which in turn is inserted in a socket 103, there also being a central passageway 105 to enable mounting same upon a spindle for winding.

Continuing with the explanation of the geometrical position of the coils, they are arranged with their facing ends in parallel planes, between which is formed the passageway 90. The upper side of the lower coil 36 is at the identical level as the lower side of the upper coil 37. Thus, in Fig. 5, the windings comprising the side 106 seem to overlie the windings forming the bottom side of the upper coil 37, which cannot be seen in the view. As noted from Fig. 5, the coils 36 and 37, although perfectly parallel, are displaced one from the other by substantially the diameter of the coils (which are identical.)

The unusual arrangement of coils, i. e., on opposite sides of the coupling loop path, is believed responsible for providing the negative coupling to prevent the circuit from oscillating when the loop is not present. It is believed that by way of explanation (and not by way of limitation) it can be said that with both coils wound in the same manner, with the bottom of one coil arranged on the same level, but spaced from the top of the other coil (i. e., on opposite sides of the loop path) one will induce in the other only a voltage of phase tending to prevent oscillation. The amount of this voltage, which I consider as produced by negative coupling sufficient to produce a stable condition of non-oscillation, is achieved, I have found, when the overlap in a vertical direction is approximately the thickness of the coil layers. This is the dimension "a" indicated in Fig. 5.

Considering now the loop 51, note that same is of a width approximately the diameter of the coils, a dimension indicated as "b" in Fig. 5, and that its length is approximately the same as the length of the coils 36 and 37 combined as positioned, this latter dimension being indicated as "c" in Fig. 5. When the loop has entered the space 90 between the coils 36 and 37, it will couple the coils to one another so that there is a positive coupling therebetween of an amount sufficient to overcome the negative coupling between the coils.

It will be pointed out that there is maximum coupling between the loop 51 and the coil sides 108 to 113 inclusive when the relative position of the loop to the coils is as illustrated in Figs. 2 and 3. In this position, a sufficient positive coupling is achieved, not only to overcome the negative coupling but to provide energy transfer from plate to grid circuits to sustain the oscillations.

I have found that the geometrical arrangement of the coils as described is ideal for my apparatus, i. e., the association of coils on opposite sides of the coupling loop path with the top side of one coinciding with the bottom side of the other gives best results. If the lower coil 36 is moved upward, the negative coupling becomes greater and the proximity of the coupling loop 51 provides positive coupling sufficient to cause only weak oscillations if at all. Likewise, lowering the lower coil substantially below the position described has been found to give rise to predominantly positive coupling which may cause the circuit to oscillate and continue to do so regardless of the presence or absence of the coupling loop 51.

It will be seen that since the single loop is sufficient to provide the desired coupling it can be made extremely light, for example of a simple aluminum wire of fine gauge. Furthermore, there is no physical connection between the loop 51 and any part of the circuit so that the needle is totally free. Another point of importance is that not only is there a minimum of capacitance between the loop 51 and the tank circuit, but the coupling is being done at low potentials decreasing the capacitance effects even further.

It is believed that the arrangement of coils on opposite sides of the loop path is advantageous over the arrangement of the loops on the same side since there is less coupling between the unadjacent parts of the coils when they are axially spaced one from the other, and less chances of flux linkage and leakage therebetween. To further decrease flux leakage, I prefer that the ratio of coil diameter "b" (see Fig. 5) to coil length "l" (see Fig. 2) be approximately three to one.

The use of rectangular coils is advantageous because it enables a substantial amount of negative coupling to be achieved by the overlapped position of the coils, and it also minimizes the size of the coupling loop 51 for a given cross section area of the coils.

The operation of the apparatus is fairly simple. The movable arm 73 is rotated manually to any desired temperature as indicated by the coincidence of the pointer or marker 82 with suitable indicia on the dial 71. The temperature of the furnace 46 is low and the needle 62 and its coupling loop 51 are somewhere along the dial away from the coils 36 and 37. The circuit 10 is not oscillating, there is substantial plate current and relay 26 is energized. Current from the power source heats the furnace through circuit 45. As temperature increases the needle 62 moves towards the marker 82. When finally they coincide, the needle has carried the coupling loop into coupling position between coils 36 and 37. There is now positive coupling between the plate and grid circuits P and G, and the circuit 10 begins to oscillate. When oscillation commences, the relay is de-energized and the contacts 42 and 43 open, de-energizing the circuit 45 and turning off the furnace 46. As the furnace cools, loop 51 leaves its position between the coils 36 and 37, whereupon oscillation ceases, relay is energized, furnace turned on, and so on. Obviously, the furnace will tend to remain at a constant temperature.

Note that in the event that the needle 51 should in some accidental manner fail to cause oscillation when it first becomes properly oriented relative to the coils 36 and 37, it will remain in that position in view of the extension 77 acting as a stop member. This prevents the needle from moving beyond any desired temperature and serves as a safety device.

I have constructed and tested a practical example of the invention for use with a galvanometer. The physical constants of the device are set forth hereinafter.

The coils 36 and 37 were each formed of 40 turns of No. 36 gauge enamel coated copper wire wound in layers upon rectangular forms one-sixteenth inch long and about .150 inch square to produce two coils each about three-sixteenths of an inch square. The space 90 between coil faces was about one-sixteenth of an inch. The coils each had an inductance of about 10 microhenries and the leads were both taken from an outside corner of the coil (see Fig. 3). The condensers were such to provide about 120 micromicrofarads in each tank circuit. Satisfactory operation was obtained at frequencies achieved through the use of from 100 to 200 micromicrofarads. Such condensers are available commercially in cylindrical sizes to be used as condensers 34 and 38 in the drawings. The condenser 38 may be 120 micromicrofarads and the condenser 34 100 micromicrofarads so that the trimmer 35, which is not carried on the end of the arm 73 can be from 7 to 45 micromicrofarads in range. Note that the "sensitive" leads from the condensers are on the bottom of the block 75 as indicated at 130.

The example which was built and tested was found to have a tolerance in relative vertical positioning of the coils 36 and 37 of .020 inch up or down from the optimum condition of negative coupling. In other words, completely stable and satisfactory operation was obtained within this range.

The coupling loop for the above example was a loop of copper or Phosphor bronze wire .017 inch thick formed in a rectangle three-eighths by three-sixteenths of an inch. At the oscillation point the loop was noted to cover about seven-eighths of the coil areas, and as stated the sensitivity was such that the amount of movement between oscillation and non-oscillation was about the width of the needle, i. e., about the order of a few hundredths of an inch. The amount of area of the coils which is covered decreases with the size of the coils. In other words, the positive coupling seems to increase as the size of coils decreases. I have found that for one-quarter inch square coils, it was only necessary that six-tenths of the coil area be covered by the loop 51 to supply sufficient positive coupling to cause oscillation.

It is essential that the coupling loop 51 have low resistivity to minimize losses, and hence the ends of the wire forming the loop would be carefully welded or joined together. This point is probably best chosen as the end of the needle, at 131.

For the above example the following circuit constants were used in addition to those mentioned:

Condensers:
- 40 — 750 mmf.
- 31 — 250 mmf.
- Choke 27' — 2–5 millihenries.
- Grid leak 32 — 1 megohm.
- Tube 11 — 6C4.
- Relay 26 — 230 volts rating.

Other circuit constants are of conventional and well known characteristics.

It is desired to point out that irrespective of the theories set forth by reason of which it is believed the advantageous results described are achieved, no limitations are intended thereby. The scope of my invention is intended to be measured by structure producing such results, and such structure is obviously capable of considerable variation and change as to details without departing from the spirit of the invention. It is only desired to be limited by the claims as interpreted with the broadest range of equivalents to which I am entitled.

What I desire to secure by Letters Patent of the United States is:

1. In apparatus of the character described, including a translating device having a swinging part, an oscillator with a plate tank circuit and a grid tank circuit, each circuit including a coil, and the coils being arranged in spaced relation one to the other and having predominant negative coupling such as normally to prevent oscillation, the swinging part including a coupling member adapted to be moved to a position between the coils to cause positive coupling, said coils being oriented on opposite sides of the plane of movement of the swinging part with their axes parallel and spaced one above the other, and providing thereby adjacent parts, said adjacent parts having opposed inductive relationship, and other parts having reinforcing inductive relationship, the coupling member when in said position increasing the reinforcing inductive relationship of said other parts to overcome the negative coupling.

2. In apparatus of the character described, including a translating device having a swinging part, an oscillator with a plate tank circuit and a grid tank circuit, each circuit including a coil, and the coils being arranged in spaced relation one to the other and negatively coupled being such as normally to prevent oscillation, the swinging part including a coupling member adapted to be moved to a position between the coils to cause positive coupling, said coils being oriented on opposite sides of the plane of movement of the swinging part with their axes parallel and spaced one above the other, the bottom of one coil and the top of the other coil being substantially coincident relative to a plane perpendicular to the coil axes, the instantaneous currents in the coils being in the same rotational direction whereby the said bottom and top have the instantaneous currents therein in opposite sense producing more negative coupling than the remainder of the coils produce positive coupling, the coupling member serving to increase the positive coupling between coils only when oriented as aforesaid.

3. A construction as set forth in claim 2 in which the coupling member comprises a single loop of wire of a size and configuration substantially the same as the projection of the peripheral outline of said coils together upon said plane.

4. In apparatus of the character described, including a translating device having a swinging part, an oscillator with a plate tank circuit and a grid tank circuit, each circuit including a coil, and the coils being arranged in spaced relation one to the other and negatively coupled such as normally to prevent oscillation, the swinging part including a coupling member adapted to be moved to a position between the coils to cause positive coupling, said coils being generally of square configuration and each having a length substantially less than its diameter, being of substantially the same electrical characteristics and having the bottom side edge of one directly opposite the top side edge of the other, and the instantaneous currents in the coils being in the same rotational direction whereby the directly opposite edges have instantaneous current in opposed directions and provide more negative coupling than the remainder of the coils provide positive coupling, but only when said coupling member is not in said position between said coils.

5. In apparatus of the character described and including a translating device having a movable part the position of which is indicative of conditions to be controlled by said apparatus, indicia cooperating with the said part, an oscillator the output of which varies said conditions, a marker placeable at a position relative to said indicia such that when the said part moves adjacent said marker a change will occur in the output of said oscillator, and said oscillator normally not oscillating when the part and marker are not adjacent one to the other; the herein invention which comprises, said oscillator having a plate tank coil and a grid tank coil carried by the marker and oriented one relative to the other whereby to produce negative coupling therebetween normally preventing oscillation and said coils being arranged with a space between them, said part carrying coupling means movable in said space to a position providing positive coupling between the coils to cause oscillation of said oscillator.

6. A construction as described in claim 5 in which the coils are substantially shorter in length than their diameter, and they are arranged with their axis parallel but spaced apart and said coupling means moves between the coils in a plane generally defined by said space and perpendicular to said coil axes.

7. A construction as described in claim 6 in which the coupling means comprises a wire loop of a configuration substantially the same as the peripheral outline of both coils projected upon said plane.

8. In apparatus of the character device in which there is a translating device, a needle movable over a dial of the device to indicate conditions to be controlled by the apparatus, a marker manually movable relative to the dial to any pre-determined position so that coincidence between the marker and the needle will actuate condition controlling means, the apparatus including an electronic oscillator the output of which contains said condition controlling means, and the oscillator adapted to be set into oscillation when the marker and needle coincide; the herein invention which comprises an arm having a common pivotal axis with said needle, the oscillator having two tank circuits adapted to be coupled one to the other to provide proper feedback for oscillation, each tank circuit including a tank coil and a tank condenser, at least the coils of both tank circuits being carried by said arm along with said marker, with the coils arranged inductively one relative to the other with a part of one adjacent a part of the other and there being opposite instantaneous currents in said adjacent parts to provide negative coupling therebetween, the remainders of the coils providing positive coupling, but to a lesser degree such that normally there is a resultant negative coupling preventing oscillation, said needle carrying a coupling member movable in a plane which will carry the coupling member to a position to increase the positive coupling of the coils to provide oscillation feedback when the marker and needle coincide.

9. A structure as defined in claim 8 in which the arm includes a block and the condensers are carried within the block, the block has a hook-like extension, one coil is carried on opposite sides of the inside of the hook, and the coupling member is adapted to move in a plane between the coils.

10. A structure as defined in claim 8 in which the arm includes a block having the condensers therein, one coil is mounted on the block facing away from the pivotal axis with its axis perpendicular thereto, the block having an extension including a part directly in front of said one coil and the second coil being mounted thereon with its axis parallel to but spaced from the axis of said one coil, and the coupling member comprising a loop of wire movable into the space between the coils in a plane about the said pivotal axis.

11. A structure as defined in claim 10 in which the coils are separated end from end by a space just narrow enough to permit free passage of said loop of wire, and separated axis from axis by a distance equal to half the diameter of the coils so that each has an edge coinciding relative to a plane perpendicular to their axes.

12. A structure as defined in claim 8 in which the coils are each relatively square, both being identical and mounted on opposite sides of the said plane with their axes parallel and spaced one from the other, and with the top side edge of one coinciding with the bottom side edge of the other, the said coupling member comprising a rectangular closed loop of wire.

References Cited in the file of this patent

UNITED STATES PATENTS

| Number | Name | Date |
|---|---|---|
| 2,026,874 | Eitel et al. | Jan. 7, 1936 |
| 2,154,260 | Brandenburger | Apr. 11, 1939 |
| 2,234,184 | McLaren | Mar. 11, 1941 |
| 2,234,895 | Cerveny | Mar. 11, 1941 |
| 2,258,652 | James | Oct. 14, 1941 |
| 2,411,247 | Cohen | Nov. 19, 1946 |
| 2,441,464 | Albright | May 11, 1948 |
| 2,468,138 | Terry | Apr. 26, 1949 |
| 2,484,022 | Esval | Oct. 11, 1949 |
| 2,487,523 | Coake | Nov. 8, 1949 |
| 2,494,438 | Gilbert | Jan. 10, 1950 |
| 2,505,577 | Rich | Apr. 25, 1950 |
| 2,514,918 | Wannamaker | July 11, 1950 |
| 2,529,846 | McBraver | Nov. 14, 1950 |
| 2,531,313 | Wannamaker | Nov. 21, 1950 |
| 2,540,728 | Hansen | Feb. 6, 1951 |
| 2,559,266 | Wannamaker | July 3, 1951 |
| 2,564,937 | Wannamaker | Aug. 21, 1951 |